Feb. 17, 1953　　　M. R. HUBBARD　　　2,629,081
HIGH-FREQUENCY INDUCTOR
Filed April 26, 1950
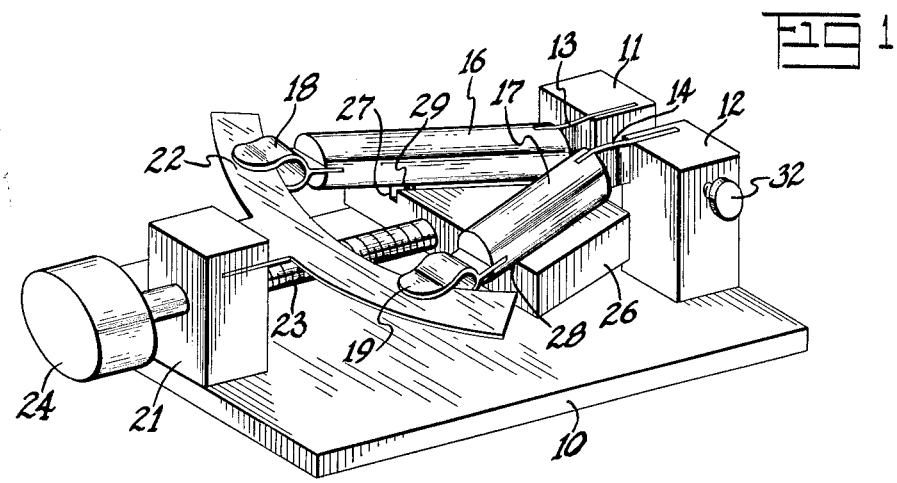
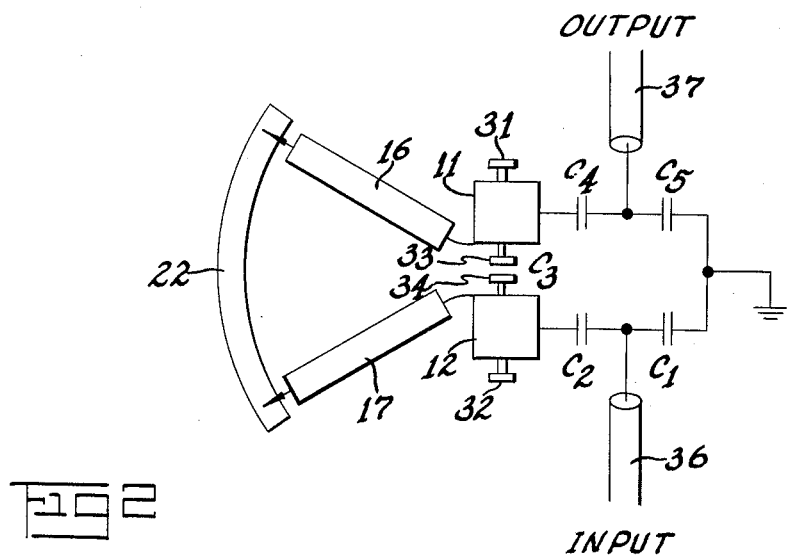
INVENTOR.
MERLE R. HUBBARD
BY Marvin Moody
Attorney Patented Feb. 17, 1953

2,629,081

UNITED STATES PATENT OFFICE 2,629,081

HIGH-FREQUENCY INDUCTOR

Merle R. Hubbard, Cedar Rapids, Iowa, assignor to Collins Radio Company, Cedar Rapids, Iowa, a corporation of Iowa Application April 26, 1950, Serial No. 158,225

3 Claims. (Cl. 336—137)

This invention relates in general to a high frequency tuner and in particular to a variable inductor.

In the field of electronics, higher and higher frequencies are being used, and it becomes increasingly difficult to obtain capacitances and inductances as the frequency is increased. At times it is desirable to have tunable inductors at these high frequencies.

It is an object of this invention, therefore, to provided a variable inductor which may be used at high frequencies.

Another object of this invention is to provide a tunable inductor which may be varied in a predetermined manner.

Yet another object of this invention is to provide a tuned circuit which may have its resonant frequency varied linearly with respect to the rotation of a shaft.

A feature of this invention is found in the provision for a pair of bars rigidly mounted to supporting means at one end, and movable relative to each other along a common shorting bar at the free ends.

Further objects, features, and advantages of this invention will become apparent from the following description and claims when read in view of the drawings, in which:

Figure 1 is a perspective view of the variable tuned circuit of this invention, and;

Figure 2 is a schematic diagram of the apparatus of Figure 1 illustrating the various electrical connections.

Figure 1 shows a base member 10 made of insulating material, for example, Bakelite. A pair of upwardly extending posts, 11 and 12 respectively, are mounted adjacent one end of the plate 10 by suitable holding means as, for example, screws, not shown. Posts 11 and 12 may be made from conducting material as, for example, copper. Attached to the posts 11 and 12 are a pair of flexible conducting members 13 and 14. Attached to the free end of the support members 13 and 14 are a pair of conducting bars or rods 16 and 17. Slide contacts 18 and 19 are attached to the free end of each bar. A third upright post 21 is connected to the opposite end of the plate 10 and has a crescent shaped shorting bar 22 attached thereto. The shorting bar 22 might be of copper. The slide contacts 18 and 19 slidably engage the shorting bar 22. A shaft 23 is threadedly received through the post 21 and has a thumb screw 24 attached to one end thereof. The opposite end of the shaft 23 is rotatably attached to a wedge shaped member 26 which may be made of polystyrene or other insulating material. The wedge shaped member 26 is formed with a pair of slots 27 and 28 which receives therein pins 29 that are attached to the shorting bars 16 and 17, respectively.

As the thumb screw 24 is rotated it moves the threaded shaft 23 longitudinally of the pillar 21 and the bars 16 and 17 are moved in an arc along the shorting bar 22. The shape of the slots 27 and 28 determine the motion imparted to the bars 16 and 17, and variations in the shape of the slot change the characteristics of the tuner.

A variable condenser is connected across the pillars 11 and 12 and comprises, as best shown in Figure 2, the thumb screws 31 and 32 which pass transversely through the pillars 11 and 12 to terminate in condenser plates 33 and 34, respectively. Adjustment of the distance between the plates 33 and 34 varies the capacitance in a well known manner.

Figure 2 illustrates the tuner of this invention showing its use as a filter. An input cable 36 has its center conductor connected between two condensers $C_1$ and $C_2$. The opposite side of $C_1$ is connected to ground. The opposite side of $C_2$ is connected to the pillar 12. Capacitors $C_4$ and $C_5$ are connected in series between the pillar 11 and ground and an output cable 37 is connected between condensers $C_4$ and $C_5$. As the position of the bars 16 and 17 is adjusted for a particular frequency, the output from 37 will contain the resonant frequency of the tuner. The condenser $C_3$ may be adjusted to vary the tuning range. The apparatus will have a high "Q."

The applicant has built and tested a tuner which may be adjusted over the range from 100 to 400 megacycles, and very linear results have been obtained when frequency is potted against angular position of the shaft 23. Applicant used bars 16 and 17 which are about two inches in length and have a diameter of approximately ⅜ of an inch. The values for the condensers are:

$C_1$—40 micromicrofarads
$C_2$—2 micromicrofarads
$C_3$—variable between 0.3–2.0 micromicrofarads
$C_4$—2 micromicrofarads
$C_5$—20 micromicrofarads It is seen that this invention provides means for obtaining a variable tuner which may have a linear tuning chaarcteristic over a relatively wide band.

Although this invention has been described with respect to particular embodiments thereof, it is not to be so limited as changes and modifications may be made therein which are within the full intended scope, as defined by the appended claims.

I claim:

1. A high frequency tunable circuit comprising, a first post, a second post, a first conducting rod connected to said first post, a second conducting rod connected to said second post, a third post, a shorting bar attached to said third post and engaging the ends of the first and second conducting rods, a shaft threadedly received through said third post, a wedge shaped member rotatably supported at one end of said shaft, a pair of slots formed in said wedge shaped member, downwardly extending pins connected to each of said rods and received in said slots, and means for rotating said shaft to vary the inductance of the tuner.

2. A high frequency tunable circuit comprising an insulated base member, a first upright electrically conducting post mounted on said base member, a second electrically conducting post mounted adjacent the first post on the base member, a first flexible electrical conducting means attached to said first post, second flexible electrically conducting means connected to the second post, a first electrically conducting rod connected to the first flexible means, a second electrically conducting rod connected to the second flexible means, a third post mounted to the base member, a crescent-shaped electrically conducting shorting bar attached to said third post, and the ends of the first and second conducting rods farthest from the flexible members slidably engageable with the shorting bar.

3. A high frequency variable tuner according to claim 2 wherein the third post supports a threaded shaft therethrough, an electrically insulating wedge-shaped member mounted to the end of said threaded shaft, first transverse means atached to the first rod and engageable with a first slot formed in said wedge member, second transverse means attached to the second rod and engageable in a second slot formed in the wedge-shaped member, and means for turning said threaded shaft to vary the distance between said rods.

MERLE R. HUBBARD.

REFERENCES CITED

The following references are of record in the file of this patent:

UNITED STATES PATENTS

| Number | Name | Date |
|---|---|---|
| 926,934 | De Forest | July 6, 1909 |
| 2,382,435 | Mann et al. | Aug. 14, 1945 |
| 2,384,504 | Thias | Sept. 11, 1945 |
| 2,445,700 | Vaughan | July 20, 1948 |
| 2,446,003 | Gardiner | July 27, 1948 |
| 2,453,994 | Lappin et al. | Nov. 16, 1948 |
| 2,467,737 | Germer | Apr. 19, 1949 |
| 2,491,480 | Davis et al. | Dec. 20, 1949 |
| 2,510,272 | Arnett | June 6, 1950 |